(12) United States Patent
Kwong et al.

(10) Patent No.: US 10,182,461 B2
(45) Date of Patent: Jan. 15, 2019

(54) EFFICIENT USE OF HS-SCCH ORDERS AND MAC CONTROL INFORMATION

(71) Applicant: Telefonaktiebolaget LM Ericsson (publ), Stockholm (SE)

(72) Inventors: Waikwok Kwong, Solna (SE); Cecilia Eklöf, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1 day.

(21) Appl. No.: 15/518,831

(22) PCT Filed: Nov. 17, 2015

(86) PCT No.: PCT/SE2015/051230
§ 371 (c)(1),
(2) Date: Apr. 13, 2017

(87) PCT Pub. No.: WO2016/080894
PCT Pub. Date: May 26, 2016

(65) Prior Publication Data
US 2017/0245257 A1    Aug. 24, 2017

Related U.S. Application Data

(60) Provisional application No. 62/081,090, filed on Nov. 18, 2014.

(51) Int. Cl.
*H04W 76/11* (2018.01)
*H04W 76/27* (2018.01)
*H04W 72/04* (2009.01)

(52) U.S. Cl.
CPC ........ *H04W 76/11* (2018.02); *H04W 72/0406* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 6,717,956 B1 | 4/2004 | Fan et al. | |
| 2005/0111410 A1* | 5/2005 | Bazar | H04W 4/24 370/331 |

(Continued)

FOREIGN PATENT DOCUMENTS

| | | |
|---|---|---|
| WO | 2006033636 A1 | 3/2006 |
| WO | 2014120061 A1 | 8/2014 |

OTHER PUBLICATIONS

Huawei, "Seamless state transition from enhanced CELL_FACH to CELL_DCH", 3GPP TSG RAN WG2 #64, Nov. 10-14, 2008, pp. 1-3, Prague, Czech Republic, R2-086654.

(Continued)

*Primary Examiner* — Steven H Nguyen
(74) *Attorney, Agent, or Firm* — Sage Patent Group (57) ABSTRACT

This disclosure relates to wireless communication. In one aspect, the technology described herein concerns a method performed by, or executed in, a control node of a wireless communication network, e.g. a RNC. The method comprises generating (401) an identifier (e.g. a handshake ID), and associating (402) the identifier with one HS-SCCH order as well as one MAC Control Information. It is thus possible to establish a one-to-one mapping between the identifier and said HS-SCCH order and said MAC Control Information. Furthermore, the generated identifier and its associated HS-SCCH order as well as its associated MAC Control Information may be communicated to another node (e.g. a UE and/or a RBS) of the wireless communication network.

16 Claims, 7 Drawing Sheets

(56) References Cited

U.S. PATENT DOCUMENTS

2009/0257387 A1* 10/2009 Gholmieh ............. H04L 5/0053
                                                                370/329
2013/0114577 A1*  5/2013 Cai ................... H04W 56/0045
                                                                370/336
2014/0036808 A1*  2/2014 Pelletier ................ H04W 72/14
                                                                370/329

OTHER PUBLICATIONS

Ericsson, "Improved Synchronized RRC Procedures", 3GPP TSG RAN WG2 #88, Nov. 17-21, 2014, pp. 1-4, San Francisco, US, R2-145044.
Ericsson, "Improved Synchronized RRC Procedures", 3GPP TSG RAN WG2 #89, Feb. 9-13, 2015, pp. 1-4, Athens, Greece, R2-150206.
Siemens, "DPCCH Signalled Fast Synchronised Reconfiguration", 3GPP TSG RAN2#53, May 8-12, 2006, pp. 1-6, China, Shanghai, Tdoc R2-061471.

* cited by examiner

EFFICIENT USE OF HS-SCCH ORDERS AND MAC CONTROL INFORMATION

TECHNICAL FIELD

This disclosure relates to wireless communication. More particularly, the disclosure concerns an efficient use of High-Speed Shared Control Channel (HS-SCCH) orders and Medium Access Control (MAC) Control Information. Also, the disclosure inter alia relates to improved Radio Resource Control (RRC) procedures.

BACKGROUND

This section is intended to provide a background to the various embodiments of the technology that are described in this disclosure. The description in this section may include concepts that could be pursued, but are not necessarily ones that have been previously conceived or pursued. Therefore, unless otherwise indicated herein, what is described in this section is not necessarily prior art to the description and/or claims of this disclosure and is therefore not admitted to be prior art by the mere inclusion in this section.

Detailed descriptions of radio communication networks and systems can be found in literature, such as in Technical Specifications published by, e.g., the $3^{rd}$ Generation Partnership Project (3GPP). 3GPP Long Term Evolution (LTE) is the fourth-generation radio communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a user equipment (UE) is wirelessly connected to a Radio Base Station (RBS) commonly referred to as a Node B (NB) in UMTS, and as an evolved NodeB (eNodeB or eNB) in LTE. An RBS is a general term for a radio network node capable of transmitting radio signals to a UE and receiving signals transmitted by a UE. As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction.

MAC-Level Handshake for Faster and More Robust RRC Synchronized Procedures

The Radio Resource Control (RRC) protocol is responsible for the establishment, maintenance and release of a RRC connection between the UE and the Radio Access Network (RAN) as well as the establishment, reconfiguration and release of Radio Bearers (RBs) and Signaling Radio Bearers (SRBs).

Different RRC procedures (e.g. RB Setup, RB Release and RB Reconfiguration) can be used to reconfigure the RAB parameters, RB/SRB parameters, transport channel parameters and physical channel parameters in the UE from one "source configuration" to another "target configuration". The reconfiguration is typically triggered by data activity and/or inactivity of existing radio bearers or setup/release of new radio bearers.

Figure 1:
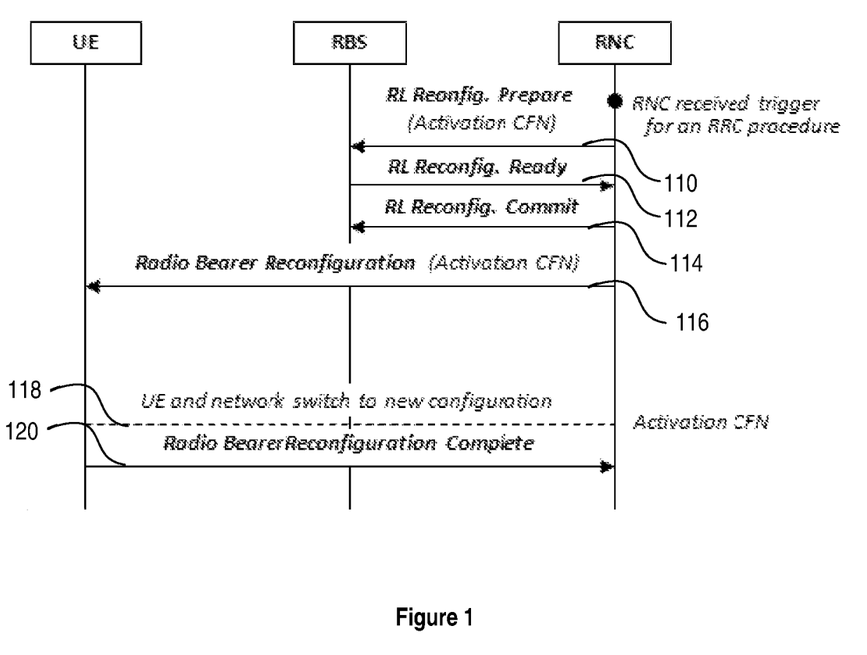
FIG. 1 is a signaling diagram of conventional synchronized RRC procedures.

For some reconfigurations it may be important that the UE and the network change configuration at exactly the same time. In other words, it may be important that the configuration change at the UE as well as at the network occur essentially at the same time. Otherwise there may be a misalignment between which configurations the UE and the network are using. In turn, this may lead to a situation where the UE and the network cannot communicate with each other any longer. These reconfigurations are typically done using synchronized RRC procedures. FIG. 1 shows an example of a conventional method for synchronized RRC procedures.

As can be seen in FIG. 1, the Radio Network Controller (RNC) initially receives a trigger for a reconfiguration. Thereafter, the RNC sends, i.e. transmits, reconfiguration messages to the UE and the Radio Base Station (RBS) comprising the new configuration. In the reconfiguration messages, an activation time is typically included. The activation time typically specifies the Connection Frame Number (CFN) when the UE and the RBS should switch to the new configuration. The RNC calculates when the UE could be ready to switch to the new configuration and sets the CFN accordingly.

In order to minimize, or at least reduce, the risk of a dropped call due to state misalignment between the UE and the RBS, the RNC generally needs to make sure that the UE will receive the reconfiguration message in time and will switch at the specified CFN. It is therefore customary to estimate the activation CFN very conservatively to take into account UEs that may be in poor radio condition, large possible fluctuations in transport network delay, etc. The result may be a rather long activation time implying that all reconfigurations have to suffer from a long delay that is, in fact, needed only in a few percent of the cases.

The international patent application PCT/SE2014/050010 (published under WO2014/120061A1), filed Jan. 7, 2014, entitled "Changing Radio Bearer Configuration or State", the entire contents of which is incorporated herein by reference, describes a procedure for fast E-DCH TTI switch. A similar procedure has also been proposed to be used for synchronized RRC procedures in general, see e.g. FIG. 2.

Figure 2:
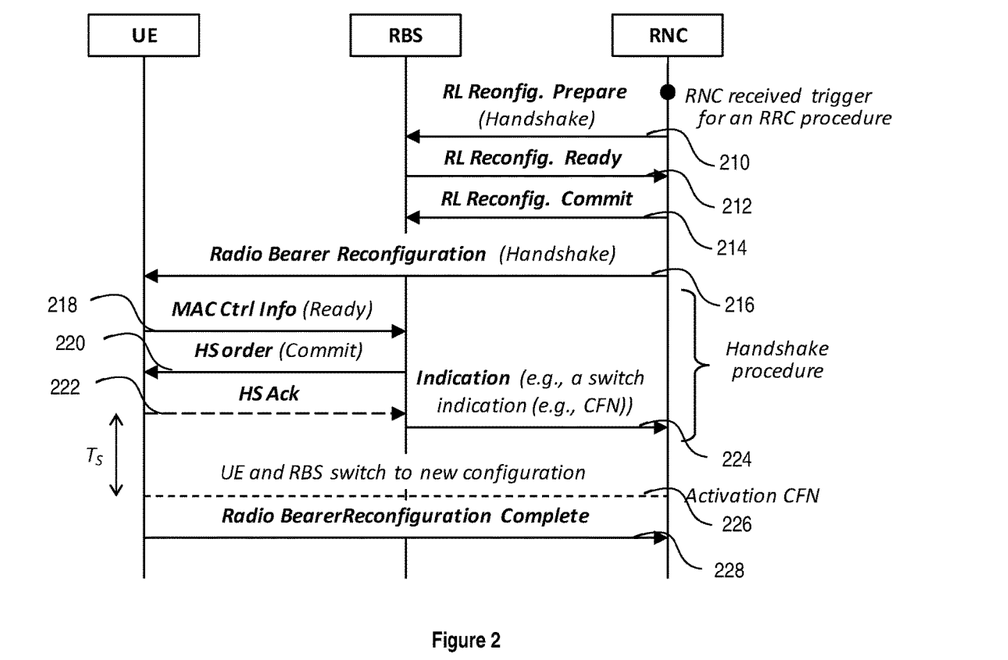
FIG. 2 is a signaling diagram showing the handshake of improved synchronized RRC procedures.

In a procedure like the procedure shown in FIG. 2 no activation time is sent to the UE. Instead, an indication is sent to the UE to activate the new configuration as soon as possible. This is accomplished by means of a MAC-level handshake between the UE and the RBS. When the UE is ready to switch, the UE sends a MAC Control Information to the RBS which then replies with an HS-SCCH order to activate the reconfiguration.

An advantage with this solution is that it is not necessary to choose between a fast reconfiguration and a robust reconfiguration. The procedure generally chooses what is needed for the specific case. In case of good radio conditions the procedure will be faster than if the RNC had calculated the activation time and perhaps added margins for a poorer case. In case of bad radio conditions the procedure may take a bit longer, but the connection will generally not be dropped as it would most likely have been if the RNC had calculated a too tight activation time.

In some cases, e.g., the Fast E-DCH TTI Switch, the RNC may be able to delegate the responsibility of initiating the switch procedure to the UE by pre-configuring the UE with a measurement, a triggering condition, and a target configuration. When the triggering condition is met, the UE would start the handshake procedure by sending a MAC Control Information to the RBS. The UE would then switch to the target configuration at an understood time after having received a reply in the form of an HS-SCCH order from the RBS.

HS-SCCH Orders

The HS-SCCH orders are defined in 3GPP Technical Specification 3GPP TS25.212. Each HS-SCCH order typically comprises the following information:

Extended order type (2 bits) $X_{eodt,1}$, $X_{eodt,2}$

Order type (3 bits): $X_{odt,1}$, $X_{odt,2}$, $X_{odt,3}$

Order (3 bits): $X_{ord,1}$, $X_{ord,2}$, $X_{ord,3}$

UE identity (16 bits): $X_{ue,1}$, $X_{ue,2}$, ..., $X_{ue,16}$

There is a total of 256 HS-SCCH orders divided into 32 types. The current practice is to use one HS-SCCH order for a very specific purpose. Some examples are:

The E-DCH TTI Switch feature uses one HS-SCCH order for the 2 ms→10 ms switch and one for the 10 ms→2 ms switch.

The Continuous Packet Connectivity (CPC) feature reserves 8 HS-SCCH orders, but uses 6 for activation and deactivation of DTX (i.e., discontinuous transmission), DRX (i.e., discontinuous reception) and HS-SCCH-less operation.

The Multi-Carrier features uses over 100 HS-SCCH orders for the activation and deactivation of Secondary serving HS-DSCH cells and Secondary uplink frequency. The large number of HS-SCCH orders used makes it possible to send one HS-SCCH order to activate or deactivate almost any combination of 1 Secondary uplink frequency and 7 downlink Secondary serving HS-DSCH cells.

To date, there are 4 unused HS-SCCH order types and a total of roughly 50 HS-SCCH orders remaining, which includes unused orders in some of the used types.

MAC Control Information

The signaling of Control Information for E-DCH is defined in 3GPP TS25.321. The scheduling information is used by UEs to indicate to their serving E-DCH Node B (NB) the amount of resources the UEs require and the MAC Control Information is used by UEs to indicate to their serving E-DCH NB additional UL control information.

Figure 3:
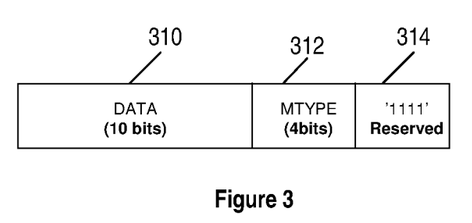
FIG. 3 is an example of a MAC Control Information PDU.

The general format of the UL MAC control information PDU is FIG. 3, where for each field the LSB is the rightmost bit in the figure and the MSB is the leftmost bit.

The UL MAC control information includes the following common fields:

MTYPE (MessageType): The length of the MTYPE field may be 4 bits. MTYPE indicates the type of Control Information that is transmitted.

DATA: The length of the DATA field may be 10 bits. DATA may carry information, the content of which is dependent on the control information type.

The existing practice of defining one HS-SCCH order for each specific task when applied to MAC-level handshake for synchronized RRC procedures may lead to at least two potential challenges:

1. HS-SCCH orders are limited in number. The potentially large number of synchronized RRC procedures may consume a large fraction of the remaining HS-SCCH orders.
2. It is not obvious from the start which synchronized RRC procedures would benefit from the use of a MAC-level handshake. This may have the consequence that new HS-SCCH orders need to be defined every time when a new procedure suitable for use with the handshake is identified.

A similar potential challenge generally exists for the MAC Control Information. It may thus be preferable not having to define specific MAC Control information for each type of reconfiguration as there may exist a large number of reconfigurations where a MAC Control Information may be needed.

SUMMARY

It is in view of the above considerations and others that the various embodiments disclosed herein have been made.

In one of its aspects, this disclosure concerns a method performed by a node of a wireless communication network. This node may be a control node, e.g. a RNC.

An identifier is generated. Furthermore, the generated identifier is associated with one HS-SCCH order as well as one MAC Control Information to establish a one-to-one mapping between the generated identifier and said HS-SCCH order and, also, a one-to-one mapping between the generated identifier and said MAC Control Information.

The generated identifier and its associated HS-SCCH order as well as its associated MAC Control Information may be communicated to another node of the wireless communication network. This another node may be UE. Alternatively, said another node may be a RBS.

In some embodiments, the identifier may be a handshake identifier. In one embodiment, the method may comprise generating a RRC procedure identifier for identifying a RRC procedure to be established; and associating the RRC procedure identifier with the handshake identifier to establish a one-to-one mapping between said RRC procedure identifier and said handshake identifier.

In another of its aspects, this disclosure concerns a node of a wireless communication network. The node may be a control node, e.g. a RNC.

The node comprises means adapted to generate an identifier; and means adapted to associate the identifier with one HS-SCCH order as well as one MAC Control Information to establish a one-to-one mapping between the identifier and said HS-SCCH order and, also, a one-to-one mapping between the identifier and said MAC Control Information.

In some embodiments, the node may additionally comprise means adapted to communicate the generated identifier and its associated HS-SCCH order as well as its associated MAC Control Information to another node of the wireless communication network. Said another node may be a UE or, alternatively, a RBS.

The identifier may be referred to as a handshake identifier.

Additionally, or alternatively, the node may comprise means adapted to generate a RRC procedure identifier for identifying a RRC procedure to be established; and means adapted to associate the RRC procedure identifier with the handshake identifier to establish a one-to-one mapping between said RRC procedure identifier and said handshake identifier.

In yet another of its aspects, this disclosure concerns a method performed by a node of a wireless communication network. The node may be a control node such as a RNC.

A plurality of identifiers is generated. Furthermore, each one of the plurality of identifiers is associated with one HS-SCCH order as well as one MAC Control Information to establish a mapping between each one of the generated plurality of identifiers and a respective HS-SCCH order as well as a respective MAC Control Information. Moreover, a message may be communicated to another node (e.g., a UE or a RBS) of the wireless communication network, wherein the message includes said mapping.

Additionally, or alternatively, the method may comprise generating a plurality of RRC procedure identifiers for identifying different RRC procedures to be established; and associating each one of the generated RRC procedure identifiers with one of the generated plurality of identifiers to establish a one-to-one mapping between each one of the RRC procedure identifiers and a respective one of the generated plurality of identifiers.

The identifier may be referred to as a handshake identifier.

In still another of its aspects, this disclosure concerns a node of a wireless communication network. The node may be a control node, e.g. a RNC.

The node comprises means adapted to generate a plurality of identifiers and means adapted to associate each one of the plurality of identifiers with one HS-SCCH order as well as one MAC Control Information to establish a mapping between each one of the generated plurality of identifiers and a respective HS-SCCH order as well as a respective MAC Control Information. Also, means adapted to communicate a message to another node (e.g., a UE or a RBS) of the wireless communication network may be provided. Said message may include said mapping.

Additionally, or alternatively, the node may comprise means adapted to generate a plurality of RRC procedure identifiers for identifying different RRC procedures to be established; and means adapted to associate each one of the generated RRC procedure identifiers with one of the generated plurality of identifiers to establish a one-to-one mapping between each one of the RRC procedure identifiers and a respective one of the generated plurality of identifiers.

The identifier may be referred to as a handshake identifier.

In still another of its aspects, this disclosure concerns a node of a wireless communication network, the node comprising a processor and a memory wherein said memory includes instructions executable by said processor whereby said node is operative to generate an identifier; and associate the identifier with one High-Speed Shared Control Channel, HS-SCCH, order as well as one Medium Access Control, MAC, Control Information to establish a one-to-one mapping between the identifier and said HS-SCCH order and, also, a one-to-one mapping between the identifier and said MAC Control Information.

The node may also comprise a transmitter adapted to communicate the generated identifier and its associated HS-SCCH order as well as its associated MAC Control Information to another node of the wireless communication network.

Said another node may be a UE. Alternatively, said another node may be a RBS.

The identifier may be a handshake identifier.

In some embodiments, said memory may include instructions executable by said processor whereby said node is operative to: generate a RRC procedure identifier for identifying a RRC procedure to be established; and associate the RRC procedure identifier with the handshake identifier to establish a one-to-one mapping between said RRC procedure identifier and said handshake identifier.

The node may be a control node. For example, the control node may be a RNC.

In yet another of its aspects, this disclosure concerns a node of a wireless communication network, the node comprising a processor and a memory wherein said memory includes instructions executable by said processor whereby said node is operative to: generate a plurality of identifiers; and associate each one of the plurality of identifiers with one High-Speed Shared Control Channel, HS-SCCH, order as well as one Medium Access Control, MAC, Control Information to establish a mapping between each one of the generated plurality of identifiers and a respective HS-SCCH order as well as a respective MAC Control Information; and communicate, by means of a transmitter, a message to another node of the wireless communication network, wherein the message includes said mapping.

In some embodiments, said memory includes instructions executable by said processor whereby said node is operative to: generate a plurality of Radio Resource Control, RRC, procedure identifiers for identifying different RRC procedures to be established; and associate each one of the generated RRC procedure identifiers with one of the generated plurality of identifiers to establish a one-to-one mapping between each one of the RRC procedure identifiers and a respective one of the generated plurality of identifiers.

Said another node may be a UE or, alternatively, a RBS.

The identifier may be a handshake identifier.

The node may be a control node. The control node may be a RNC.

In a further of its aspects, the disclosure concerns a computer program, comprising instructions which, when executed on at least one processor, cause the at least one processor to carry out any one the methods described hereinabove. A carrier comprising the computer program is also provided. The carrier may be one of an electronic signal, an optical signal, a radio signal, or a computer readable storage medium.

Various embodiments of the technology described herein provide one or several advantages. As will be appreciated, a generic identifier (sometimes referred to as the handshake identity or handshake ID) is introduced. For example, each configured RRC procedure that uses a MAC-level handshake may be assigned one handshake identity. Each handshake identity may also be associated with one HS-SCCH order and one MAC Control Information. For example, in a situation where multiple RRC procedures have been configured, the handshake identities make it possible for both the RBS and the UE to know which procedure is being executed when MAC Control Information and HS-SCCH orders are received. As a mere example, a UE may have been preconfigured with a Fast E-DCH TTI Switch, which may be triggered at any time when the switching criteria are met, and the RNC is initiating a procedure to set up a new Radio Access Bearer. When the UE sends a MAC Control Information to the RBS, the RBS generally needs to know the procedure that is being triggered. Since the number of simultaneously configured RRC procedures that uses a MAC-level handshake is limited, the number of needed MAC Control Information and HS-SCCH orders may also be kept at a minimum. The advantage with the proposed embodiments is hence inter alia that it is possible to use an improved procedure for many synchronized RRC reconfigurations without having to specify an unnecessarily large amount of HS-SCCH orders and MAC Control Information or having to define many separate HS-SCCH orders and a MAC Control Information for each specified procedure.

BRIEF DESCRIPTION OF DRAWINGS

These and other aspects, features and advantages will be apparent and elucidated from the following detailed description of various embodiments, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

A method performed by a node of a wireless communication network is proposed. The node is preferably, but not necessarily, a control node such as a RNC.

An identifier is generated. This identifier will sometimes be referred to as handshake identifier, or handshake ID (HID), throughout this disclosure. The generated identifier is also associated with, or otherwise linked to, one HS-SCCH order as well as one MAC Control Information to establish a one-to-one mapping between the generated identifier and said HS-SCCH order and said MAC Control Information. Furthermore, the generated identifier and its associated HS-SCCH order as well as its associated MAC Control Information may be communicated (e.g., transmitted) to one or several other nodes of the wireless communication network, such as a UE and/or a RBS. In some embodiments, the method may further comprise: generating a RRC procedure identifier (or, RRC procedure ID) for identifying a RRC procedure to be established, and associating the RRC procedure identifier with the earlier-mentioned identifier (HID) to establish a one-to-one mapping between said RRC procedure identifier and the earlier-mentioned identifier.

An advantage with the proposed method is that it may allow for an improved RRC procedure. For example, the proposed method may allow for many synchronized RRC reconfigurations without having to specify an unnecessarily large amount of HS-SCCH orders and MAC Control Information or, alternatively, having to define an HS-SCCH order and a MAC Control Information for each specified procedure.

Figure 4A:
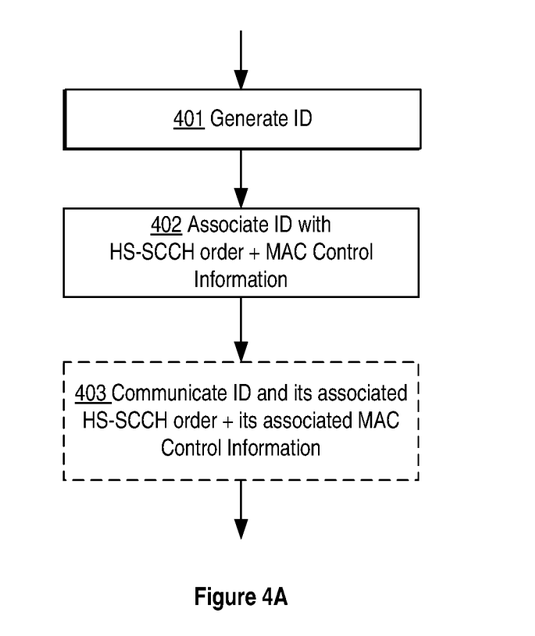
FIG. 4A is a flowchart of an example embodiment of a method performed by a node of a wireless communication network.

FIG. 4A illustrates a flowchart of a method performed by a node, in accordance with an example embodiment. The node is preferably, but not necessarily, a control node such as a RNC.

As can be seen in FIG. 4A below, the method comprises generating 401 an identifier (e.g., a handshake identifier, or handshake identity (ID)) and associating 402 the thus generated identifier with one HS-SCCH order as well as one MAC Control Information. A one-to-one mapping between the generated identifier and said HS-SCCH order and said MAC Control Information can thus be established, or defined.

The method may further comprise communicating 403 (e.g., transmit) the generated identifier and its associated HS-SCCH order as well as its associated MAC Control Information to one or several other nodes of the wireless communication network, such as UE and/or a RBS. Accordingly, a UE and/or RBS may receive the generated identifier and its associated HS-SCCH order as well as its associated MAC Control Information. In response thereto, the UE and/or RBS may utilize, or otherwise use, this received information in subsequent procedures.

With continued reference to FIG. 4A, it should be appreciated that a plurality of identifiers may be generated 401, i.e. two or more identifiers may be generated. Each one of the plurality of identifiers may also be associated 402 with one HS-SCCH order as well as one MAC Control Information to establish a mapping between each one of the generated plurality of identifiers and a respective HS-SCCH order as well as a respective MAC Control Information. Also, a message may be communicated 403 to another node of the wireless communication network, wherein this message includes said mapping.

Figure 4B:
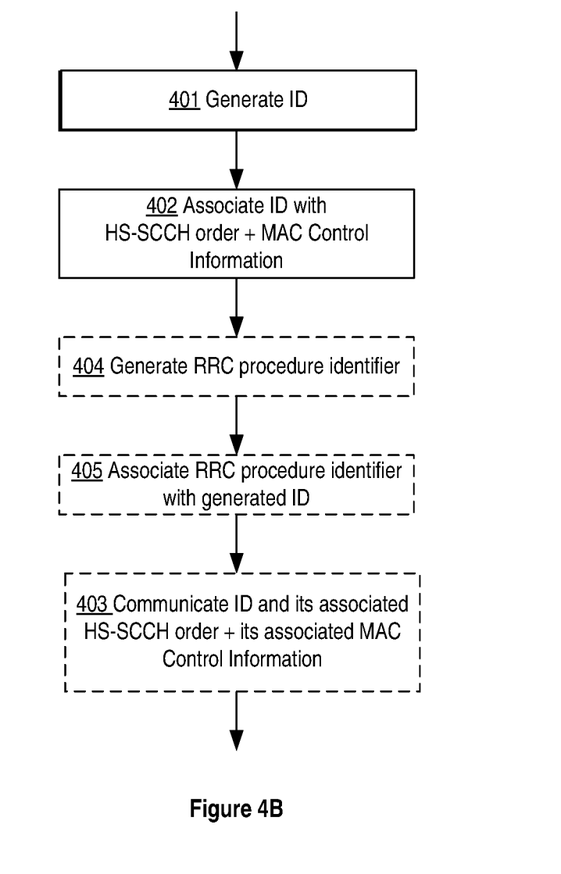
FIG. 4B is a flowchart of an example embodiment of a method performed by a node of a wireless communication network.

FIG. 4B illustrates a flowchart of a method performed by a node, in accordance with an example embodiment. As can be seen in FIG. 4B, the method may further comprise, e.g., prior to action 403: generating 404 a RRC procedure identifier for identifying a RRC procedure to be established, and associating 405 the RRC procedure identifier with the handshake identifier to establish a one-to-one mapping between said RRC procedure identifier and said handshake identifier.

With continued reference to FIG. 4B, it should be appreciated that the method may comprise generating 404 a plurality of RRC procedure identifiers (i.e., two more RRC procedure identifiers) for identifying different RRC procedures to be established; and associating 405 each one of the generated RRC procedure identifiers with one of the generated plurality of identifiers to establish a one-to-one mapping between each one of the RRC procedure identifiers and a respective one of the generated plurality of identifiers.

As will be appreciated, this disclosure also concerns a node (e.g., a control node such as a RNC) of a wireless communication network e.g. for improving a RRC procedure.

Figure 5:
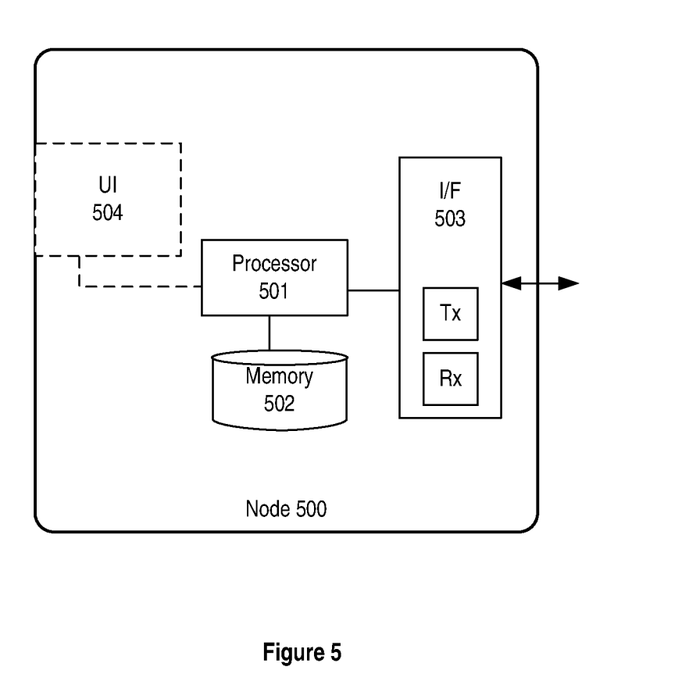
FIG. 5 is an example embodiment of a node of a wireless communication network, e.g. a control node such as a RNC.

As can be seen in FIG. 5, in accordance with one example embodiment, the node may comprise means 501, 502 adapted to generate an identifier (e.g., a handshake identifier) and means 501, 502 adapted to associate, or otherwise link, the identifier with one HS-SCCH order as well as one MAC Control Information. Hereby a one-to-one mapping between the generated identifier and said HS-SCCH order and said MAC Control Information can be established, or otherwise defined.

Also, the node 500 may comprise means 503 adapted to communicate (e.g., transmit) the generated identifier and its associated HS-SCCH order as well as its associated MAC Control Information to one or several other nodes of the wireless communication network, such as a UE and/or a RBS. Accordingly, and as described earlier, the UE and/or RBS may receive the generated identifier and its associated HS-SCCH order as well as its associated MAC Control Information. In response thereto, the UE and/or RBS may utilize, or otherwise make use of, this received information in subsequent procedures.

In one example implementation, the node 500 comprises a processor 501 and a memory 502. The memory 502 may store computer program code, which, when run in the processor 501 causes the node 500 to perform, or otherwise execute, any one of the methods described in this disclosure, e.g. any of the methods described in conjunction with FIGS. 4A and 4B, respectively.

For example, the memory 502 may store computer program code, which, when run in the processor 501 causes the node 500 to: generate an identifier; and associate the generated identifier with one HS-SCCH order as well as one MAC Control Information to establish a one-to-one mapping between the identifier and said HS-SCCH order as well as said MAC Control Information.

The memory 502 may additionally store computer program code, which, when run in the processor 501 causes the node 500 to: communicate by means of the communications interface 503 the generated identifier and its associated HS-SCCH order as well as its associated MAC Control Information to one or several other nodes of the wireless communication network, such as a UE and/or a RBS. The aforementioned communications interface 503 may comprise a transmitter (Tx) and/or a receiver (Rx). Alternatively, the communications interface 503 may comprise a transceiver (Tx/Rx) with combined transmitter and receiver functionality. The communications interface 503 may further include a radio frequency (RF) interface allowing the node 500 to communicate with other nodes and/or UEs through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

Optionally, the node 500 may additionally comprise a User Interface (UI) 504 allowing a user, or operator, to operate and interact with the node 500.

The embodiments described herein recognize the fact that HS-SCCH orders have been defined for very specific purposes in the existing art. In order to allow for an improved procedure, e.g., for synchronized RRC reconfigurations, the inventors have realized that it would be advantageous to use HS-SCCH orders in a more generic way in order to avoid consuming an unnecessarily large number of HS-SCCH orders.

There may exist several different RRC procedures that use a MAC-level handshake configuration at the same time. For example, the UE may have been preconfigured with a Fast E-DCH TTI Switch, which may be triggered at any time when the switching criteria are met, and in the meantime the RNC may be initiating another procedure, e.g., to set up a new Radio Access Bearer. When the UE sends a MAC Control Information to the RBS, the RBS generally needs to know the procedure that is being triggered.

In order to be able to distinguish between the different configured procedures and to not introduce too many MAC Control Information and HS-SCCH orders, a generic MAC-level handshake identity is therefore proposed according to some embodiments described in this disclosure. One HS-SCCH order and one MAC Control Information is defined for (or, associated with) each handshake identity. Since the number of simultaneously configured RRC procedures that uses a MAC-level handshake is typically limited, the number of handshake identities required will typically be relatively small too. Four (4) or eight (8) handshake IDs are expected to be sufficient in most scenarios.

For the case of 4 handshake identities, only 4 HS-SCCH orders and 4 MAC Control Informations are thus needed. These can be selected from any of the available HS-SCCH orders and MAC Control Informations. A particularly advantageous example is the following:

Two HS-SCCH orders have been defined for the Fast E-DCH TTI Switch. The bits for the Extended order type (2 bit), Order type (3 bit), and Order map (3 bits) are:
  11 011 000 2 ms TTI→10 ms TTI
  11 011 001 10 ms TTI→2 ms TTI
There are 6 values remaining for the order type 11 011. The HS-SCCH orders for MAC-level handshake may be defined by taking 4 for the remaining values, e.g.,

| 11 011 010 | handshake | ID = 0 |
| 11 011 011 | handshake | ID = 1 |
| 11 011 100 | handshake | ID = 2 |
| 11 011 101 | handshake | ID = 3 |

One MAC Control Information has been defined for the Fast E-DCH TTI Switch to carry a 5-bit UPH Report (in the 10-bit DATA field) using 0000 for the MTYPE field.
  UUUUU 00000 0000 1111
where "UUUUU" represents the 5-bit UPH Report field and the following "00000" are unused bits that are hardcoded to 0.

A 2-bit handshake ID field can be defined using the same MTYPE by extending the MTYPE field. This can be done in various ways. Some examples are:
1. Extend one bit to the left of MTYPE using a "1" bit as follow:
   HH000 00001 0000 1111
   Here "HH" stands for the 2-bit handshake ID and the last "1" in the DATA field is intended to be a subtype of an arbitrary length for the 0000 MTYPE. All other unused bits are hardcoded to 0 to allow extensions in the future.
2. Define an explicit subtype of 5 bit. Using the subtype 00001 for denoting handshake IDs would result in same bit pattern as the method above.
3. Use a series of "1"s follow by a "0" to fill up all the unused bit:
   HH011 11111 0000 1111
   This method makes it easy to define payload bits of arbitrary size. For example the bit pattern for a 7-bit payload would be:
   XXXXX XX011 0000 1111

When RRC Transaction IDs are available for the procedures, these RRC Transaction IDs can also be used together with handshake IDs. In the case that there is the same number of RRC Transaction IDs as handshake IDs, they may be mapped one to one. When there are more RRC Transaction IDs than handshake IDs, the modulo operation may e.g. be used to map the RRC Transaction IDs to handshake IDs.

Figure 6:
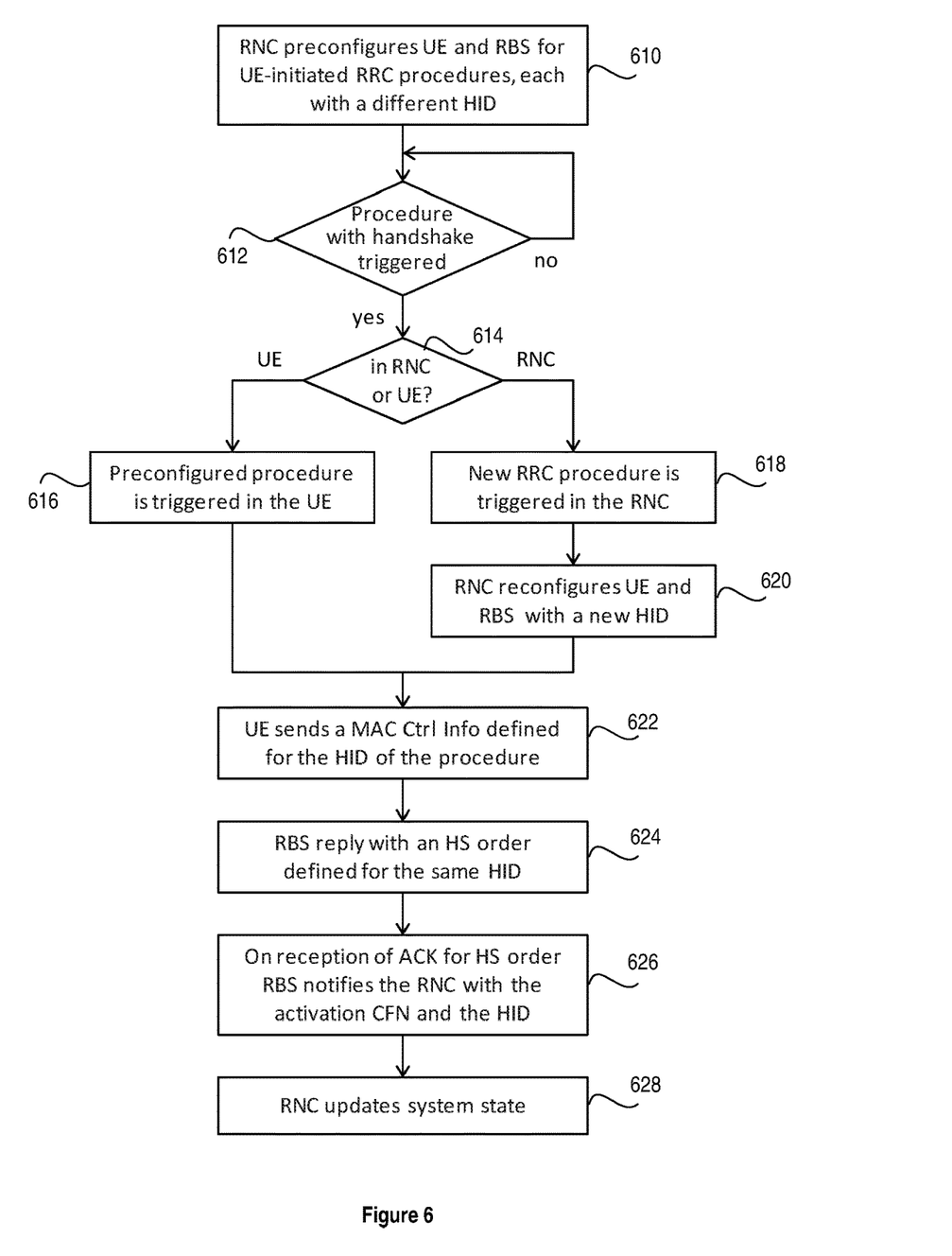
FIG. 6 is a flowchart illustrating the handling of handshake IDs (HID) in improved synchronized RRC procedures, according to an example embodiment.

With reference to FIG. 6, an example method in accordance with an embodiment will be described. FIG. 6 illustrates the use of a handshake ID (denoted as HID) for distinguishing different RRC procedures.

In this example, a control node in the form of a RNC may initially pre-configure 610 a UE and/or a RBS for UE-initiated RRC procedures. Each procedure may be assigned with a specific handshake ID (e.g., HID). Next, it may optionally be checked 612 whether a handshake-triggered procedure is supported. If, or when, it is determined that the handshake-triggered procedure is supported, it may be determined 614 whether the procedure is to be triggered by the UE or by the RNC.

This determination may be done in various ways. Also, the determination may be based on various decision criteria, which should preferably be tested and evaluated for each specific case e.g. in dependence of system requirements and/or end user demands. If, or when, it is determined that the procedure is to be triggered by the UE, the method may continue by the UE triggering 616 a preconfigured procedure. Otherwise, if or when it is determined that the procedure is to be triggered by the RNC, the method may continue by the RNC triggering 618 a new RRC procedure. The RNC may reconfigure 620 the UE and the RBS with a new HID. More particularly, the RNC may generate the new HID and, furthermore, associate the new HID with one HS-SCCH order as well as one MAC Control Information. Hereby, a one-to-one mapping between the new HID and said HS-SCCH order as well as said MAC Control Information may be established, or defined. This one-to-one mapping may then be used in the subsequent procedure(s). As can be seen in FIG. 6, the UE may e.g. send 622 a MAC Control Information defined for the HID of the procedure. In response thereto, the RBS may reply 624 with (i.e., transmit) a HS-SCCH order defined for the same HID. At reception of an acknowledge message (ACK) for an HS-SCCH order, the RBS may further notify 626 the RNC that the switch to the new configuration is ready for the concerned HID. In response to receiving this notification, the RNC may update 628 the system state.

Figure 7:
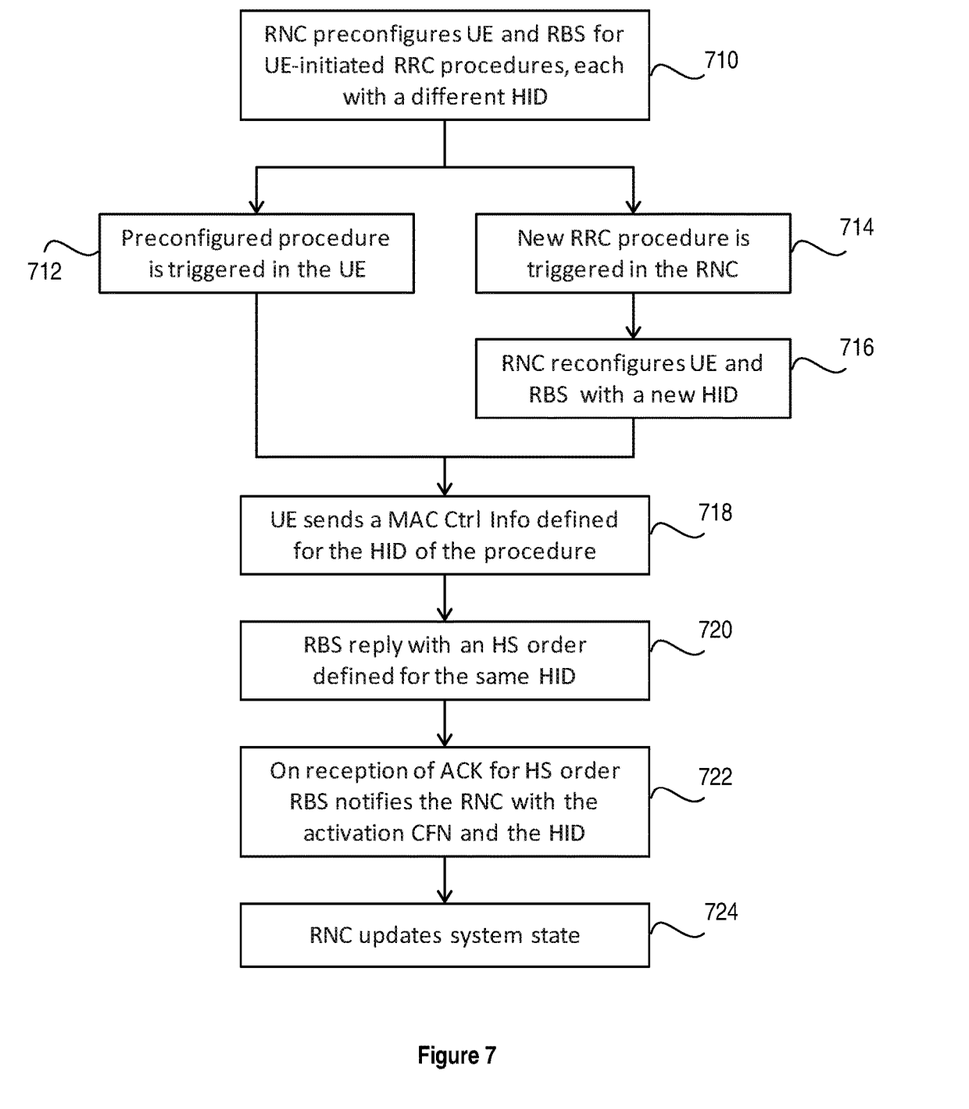
FIG. 7 is a flowchart illustrating the handling of handshake IDs (HID) in improved synchronized RRC procedures, according to an example embodiment.

In one embodiment, which is schematically illustrated in FIG. 7, the action of checking whether a handshake-triggered procedure is supported may advantageously be omitted. Instead, the method may simply continue in that one of two events may follow. In one event, a preconfigured UE-initiated procedure may be triggered (cf., 712); the UE is then ready to perform the handshake. In another event, a new RNC-initiated procedure (cf., 714; 716) may be triggered. The RNC may then initiate the reconfiguration of the UE and the RBS with a new HID 710. More particularly, the RNC may generate the new HID and, furthermore, associate the new HID with one HS-SCCH order as well as one MAC Control Information. Hereby, a one-to-one mapping between the new HID and said HS-SCCH order as well as said MAC Control Information is established, or defined. This one-to-one mapping may then be used in the subsequent procedure. In either event, as can be seen in FIG. 7, the UE may begin the handshake by e.g. sending 718 a MAC Control Information defined for the HID of the procedure. In response thereto, the RBS may reply 720 (i.e., transmit) a HS-SCCH order defined for the same HID. At reception of an acknowledge message (ACK) for an HS-SCCH order, the RBS may further notify 722 the RNC with the activation CFN and the HID. In response to receiving this notification, the RNC may update 724 the system state accordingly.

Again, various embodiments described throughout this disclosure allow for one or several advantages. For instance, an advantage with some of the disclosed embodiments is that they may allow for improved RRC procedures. For example, some of the proposed embodiments may allow for many synchronized RRC reconfigurations without having to specify an unnecessarily large amount of HS-SCCH orders and MAC Control Information or, alternatively, having to define an HS-SCCH orders and a MAC Control Information for each specified procedure.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

ABBREVIATIONS

CFN Connection Frame Number
CPC Continuous Packet Connectivity
DRX Discontinuous Reception
DTX Discontinuous Transmission
E-DCH Enhanced Dedicated Channel
HS-DSCH High Speed Downlink Shared Channel
HS-SCCH HS-DSCH Shared Control Channel
ID Identifier, Identity
LSB Least Significant Bit
MAC Medium Access Control
MSB Most Significant Bit
PDU Protocol Data Unit
RB Radio Bearer
RBS Radio Base Station
RL Radio Link
RNC Radio Network Controller
RRC Radio Resource Control
SRB Signaling Radio Bearer
TTI Transmission Time Interval
UE User Equipment
UL Uplink
UPH UE Power Headroom
UTRAN Universal Terrestrial Radio Access Network

Selected Example Embodiments

The technology disclosed herein thus encompasses without limitation the following non-limiting numbered example embodiments (NEEs):

NEE1. A method performed by, or executed in, a node of a wireless communication network and comprising:
  generating an identifier;
  associating the identifier with one HS-SCCH order as well as one MAC Control Information to establish a one-to-one mapping between the identifier and said HS-SCCH order and said MAC Control Information.

NEE2. The method according to NEE1, further comprising:
  communicating the generated identifier and its associated HS-SCCH order as well as its associated MAC Control Information to another node of the wireless communication network.

NEE3. The method according to NEE2, wherein said another node is a UE.

NEE4. The method according to NEE2, wherein said another node is a RBS.

NEE5. The method according to any one of NEE1-NEE4, wherein the identifier is a handshake identifier.

NEE6. The method according to NEE5, further comprising:
  generating a RRC procedure identifier for identifying a RRC procedure to be established; and
  associating the RRC procedure identifier with the handshake identifier to establish a one-to-one mapping between said RRC procedure identifier and said handshake identifier.

NEE7. The method according to any one of NEE1-NEE6, wherein node is a control node.

NEE8. The method according to NEE7, wherein the control node is a Radio Network Controller (RNC).

NEE9. A node of a wireless communication network, the node comprising:
  means adapted to generate an identifier;
  means adapted to associate the identifier with one HS-SCCH order as well as one MAC Control Information to establish a one-to-one mapping between the identifier and said HS-SCCH order and said MAC Control Information.

NEE10. The node according to NEE9, further comprising:
  means adapted to communicate the generated identifier and its associated HS-SCCH order as well as its associated MAC Control Information to another node of the wireless communication network.

NEE11. The node according to NEE10, wherein said another node is a UE.

NEE12. The node according to NEE10, wherein said another node is a RBS.

NEE13. The node according to any one of NEE9-NEE12, wherein the identifier is a handshake identifier.

NEE14. The node according to NEE13, further comprising:
  means for generating a RRC procedure identifier for identifying a RRC procedure to be established; and
  means for associating the RRC procedure identifier with the handshake identifier to establish a one-to-one mapping between said RRC procedure identifier and said handshake identifier.

NEE15. The node according to any one of NEE9-NEE14, wherein node is a control node.

NEE16. The node according to NEE15, wherein control node is a Radio Network Controller (RNC).

NEE17. A method performed by, or executed in, a node of a wireless communication network, the method comprising:
  generating a plurality of identifiers;
  associating each one of the plurality of identifiers with one HS-SCCH order as well as one MAC Control Information to establish a mapping between each one of the generated plurality of identifiers and a respective HS-SCCH order as well as a respective MAC Control Information; and
  communicating a message to another node of the wireless communication network, wherein the message includes said mapping.

NEE18. The method according to NEE17, further comprising:
  generating a plurality of RRC procedure identifiers for identifying different RRC procedures to be established; and
  associating each one of the generated RRC procedure identifiers with one of the generated plurality of identifiers to establish a one-to-one mapping between each one of the RRC procedure identifiers and a respective one of the generated plurality of identifiers.

NEE19. The method according to NEE17 or NEE18, wherein said another node is a UE.

NEE20. The method according to NEE17 or NEE18, wherein said another node is a RBS.

NEE21. The method according to any one of NEE17-NEE20, wherein the identifier is a handshake identifier.

NEE22. The method according to any one of NEE17-NEE21, wherein the node is a control node.

NEE23. The method according to NEE22, wherein the control node is a Radio Network Controller (RNC).

NEE24. A node of a wireless communication network, the node comprising:
  means adapted to generate a plurality of identifiers;
  means adapted to associate each one of the plurality of identifiers with one HS-SCCH order as well as one MAC Control Information to establish a mapping between each one of the generated plurality of identifiers and a respective HS-SCCH order as well as a respective MAC Control Information; and
  communicating a message to another node of the wireless communication network, wherein the message includes said mapping.

NEE25. The node according to NEE24, further comprising:
  means adapted to generate a plurality of RRC procedure identifiers for identifying different RRC procedures to be established; and
  means adapted to associate each one of the generated RRC procedure identifiers with one of the generated plurality of identifiers to establish a one-to-one mapping between each one of the RRC procedure identifiers and a respective one of the generated plurality of identifiers.

NEE26. The node according to NEE24 or NEE25, wherein said another node is a UE.

NEE27. The node according to NEE24 or NEE25, wherein said another node is a RBS.

NEE28. The node according to any one of NEE24-NEE27, wherein the identifier is a handshake identifier.

NEE29. The node according to any one of NEE24-NEE28, wherein node is a control node.

NEE30. The node according to NEE29, wherein the control node is a Radio Network Controller (RNC).

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation.

The invention claimed is:

1. A method, performed by a node of a wireless communication network for pre-configuring another node of the wireless communication network for synchronized Radio Resource Control (RRC) reconfigurations that uses a MAC-level handshake, the method comprising:
   generating, by a processor of the node, an identifier, wherein the identifier is a handshake identifier (HID);
   associating, by the processor of the node, the identifier with one High-Speed Shared Control Channel (HS-SCCH) order as well as one Medium Access Control (MAC) Control Information to establish a one-to-one mapping between the identifier and the HS-SCCH order, and also a one-to-one mapping between the identifier and the MAC Control Information,
   wherein the method further comprising:
   generating, by the processor of the node, a RRC procedure identifier for identifying a RRC procedure to be established; and
   associating, by the processor of the node, the RRC procedure identifier with the handshake identifier to establish a one-to-one mapping between the RRC procedure identifier and the handshake identifier.

2. The method of claim 1, further comprising communicating the generated identifier and its associated HS-SCCH order as well as its associated MAC Control Information to another node of the wireless communication network.

3. The method of claim 1, wherein the node is a control node.

4. A method, performed by a node of a wireless communication network for pre-configuring another node of the wireless communication network for synchronized Radio Resource Control (RRC) reconfigurations that uses a MAC-level handshake, the method comprising:
   generating, by a processor of the node, a plurality of identifiers;
   associating, by the processor of the node, each one of the plurality of identifiers with one High-Speed Shared Control Channel (HS-SCCH) order as well as one Medium Access Control (MAC) Control Information to establish a mapping between each one of the generated plurality of identifiers and a respective HS-SCCH order as well as a respective MAC Control Information;
   communicating, by the processor of the node, a message to another node of the wireless communication network, wherein the message includes the mapping;
   wherein the method further comprising:
   generating, by the processor of the node, a plurality of RRC procedure identifiers for identifying different RRC procedures to be established; and
   associating, by the processor of the node, each one of the generated RRC procedure identifiers with one of the generated plurality of identifiers to establish a one-to-one mapping between each one of the RRC procedure identifiers and a respective one of the generated plurality of identifiers.

5. The method of claim 4, wherein the identifier is a handshake identifier.

6. The method of claim 4, wherein the node is a control node.

7. A node of a wireless communication network for pre-configuring another node of the wireless communication network for synchronized Radio Resource Control (RRC) reconfigurations that uses a MAC-level handshake, the node comprising:
   processing circuitry;
   memory containing instructions executable by the processing circuitry whereby the node is operative to:
   generate an identifier, wherein the identifier is a handshake identifier;
   associate the identifier with one High-Speed Shared Control Channel (HS-SCCH) order as well as one Medium Access Control (MAC) Control Information to establish a one-to-one mapping between the identifier and the HS-SCCH order, and also a one-to-one mapping between the identifier and the MAC Control Information; wherein the node is further operative to:
   generate a Radio Resource Control (RRC) procedure identifier for identifying a RRC procedure to be established; and
   associate the RRC procedure identifier with the handshake identifier to establish a one-to-one mapping between the RRC procedure identifier and the handshake identifier.

8. The node of claim 7, further comprising a transmitter configured to communicate the generated identifier and its associated HS-SCCH order as well as its associated MAC Control Information to another node of the wireless communication network.

9. The node of claim 8, wherein the another node is a User Equipment or a Radio Base Station.

10. The node of claim 7, wherein the node is a control node.

11. A node of a wireless communication network for pre-configuring another node of the wireless communication network for synchronized Radio Resource Control (RRC) reconfigurations that uses a MAC-level handshake, the node comprising:
    processing circuitry;
    memory containing instructions executable by the processing circuitry whereby the node is operative to:
    generate a plurality of identifiers;
    associate each one of the plurality of identifiers with one High-Speed Shared Control Channel (HS-SCCH) order as well as one Medium Access Control (MAC) Control Information to establish a mapping between each one of the generated plurality of identifiers and a respective HS-SCCH order as well as a respective MAC Control Information;
    communicate, via a transmitter, a message to another node of the wireless communication network, wherein the message includes the mapping, and wherein the instructions are such that the node is further operative to:
    generate a plurality of Radio Resource Control (RRC) procedure identifiers for identifying different RRC procedures to be established; and
    associate each one of the generated RRC procedure identifiers with one of the generated plurality of identifiers to establish a one-to-one mapping between each one of the RRC procedure identifiers and a respective one of the generated plurality of identifiers.

12. The node of claim 11, wherein the another node is a User Equipment or a Radio Base Station.

13. The node of claim 11, wherein the identifier is a handshake identifier.

14. The node of claim 11, wherein node is a control node.

15. A non-transitory computer readable recording medium storing a computer program product for controlling a node of a wireless communication network for pre-configuring another node of the wireless communication network for synchronized Radio Resource Control (RRC) reconfigurations that uses a MAC-level handshake, the computer program product comprising software instructions which, when run on processing circuitry of the node, causes the node to:
generate an identifier; and
associate the identifier with one High-Speed Shared Control Channel (HS-SCCH) order as well as one Medium Access Control (MAC) Control Information to establish a one-to-one mapping between the identifier and the HS-SCCH order, and also a one-to-one mapping between the identifier and the MAC Control Information, wherein the instructions which, when run on processing circuitry of the node, further causes the node to:
generate a plurality of Radio Resource Control (RRC) procedure identifier for identifying a RRC procedure to be established; and
associate the RRC procedure identifier with the handshake identifier to establish a one-to-one mapping between the RRC procedure identifier and the handshake identifier.

16. A non-transitory computer readable recording medium storing a computer program product for controlling a node of a wireless communication network for pre-configuring another node of the wireless communication network for synchronized Radio Resource Control (RRC) reconfigurations that uses a MAC-level handshake, the computer program product comprising software instructions which, when run on processing circuitry of the node, causes the node to:
generate a plurality of identifiers;
associate each one of the plurality of identifiers with one High-Speed Shared Control Channel (HS-SCCH) order as well as one Medium Access Control (MAC) Control Information to establish a mapping between each one of the generated plurality of identifiers and a respective HS-SCCH order as well as a respective MAC Control Information; and
communicate a message to another node of the wireless communication network, wherein the message includes the mapping, wherein the instructions which, when run on processing circuitry of the node, further causes the node to:
generate a plurality of Radio Resource Control (RRC) procedure identifiers for identifying different RRC procedures to be established; and
associate each one of the generated RRC procedure identifiers with one of the generated plurality of identifiers to establish a one-to-one mapping between each one of the RRC procedure identifiers and a respective one of the generated plurality of identifiers.

* * * * *